Dec. 13, 1966    A. DESCHAMPS    3,291,739
FERROMAGNETIC MATERIALS AND METHODS OF FABRICATION
Filed Feb. 20, 1963    4 Sheets-Sheet 1

Inventor
A. DESCHAMPS
By R. F. Morris
Attorney

3,291,739
FERROMAGNETIC MATERIALS AND METHODS OF FABRICATION

André Deschamps, Paris, France, assignor to International Telephone and Telegraph Corporation, New York, N.Y., a corporation of Maryland
Filed Feb. 20, 1963, Ser. No. 259,864
Claims priority, application France, Feb. 27, 1962, 889,363; Jan. 23, 1963, 922,335
2 Claims. (Cl. 252—62.5)

The present invention relates to ferromagnetic materials particularly adapted for use in devices utilising the gyromagnetic effect at hyperfrequencies and a method for making such ferromagnetic materials.

The materials which are the object of the invention are prepared from a starting mixture of fine metallic oxide powders, which, after the mechanical preparation of a homogeneous mixture, are compressed into cores of the desired geometrical shape; these cores then being subjected to a suitable heat treatment.

These materials crystallize in the cubic system and belong to the group known as "spinels." They are usually called "ferrites." An object of this invention is to provide a novel method for producing such ferrites.

The ferrites according to the invention have remarkable properties and represent a great advance over the known ferrites. In particular their propeties have a very high stability, as a function of temperature.

The ferrites according to the invention also have advantages as regards their manufacture, since they contain oxides which make it possible to sinter them at relatively low temperatures (approx. 1200° C.). This makes them very valuable since, as soon as this sintering temperature is attained, the apparent density is sufficiently close to the deduced from the X-ray measurement of the crystalline mesh, to permit their use at hyperfrequencies. The known ferrites of manganese and magnesium which do not contain such oxides, must be sintered at high temperatures, even higher than 1400° C. before they may be used at hyperfrequencies, without having the characteristics of constancy as a function of temperature of the ferrites according to the invention.

The ferrites which are the object of the present invention are characterised by a molecular composition represented by the formula:

$$xLO, yR_2O_3, z(TO_2QO)$$

with $$48 \leqslant x \leqslant 52$$
$$y+z=100-x$$

and $$0.5 \leqslant z \leqslant 45,0$$

in which L and Q represent one or more of the metals in the bivalent state such as:

$$Fe^{++}, Mn^{++}, Co^{++}, Ni^{++}, Mg^{++}, Zn^{++}$$

in which R represents one or several of the metals in the trivalent state such as:

$$Fe^{+++}, Cr^{+++}, Al^{+++}, Ga^{+++}, Mn^{+++}$$

in which T represents one or more of the quadrivalent metals such as:

$$Ti^{++++}, Sn^{++++}$$

and with the additional proviso that $Fe^{+++}$ is always present as iron oxide $Fe_2O_3$, and constitutes at least three quarters of $yR_2O_3$.

These materials may be obtained by following a known method of ferrite manufacture which consists in mixing, in suitable proportions, the metallic oxides LO, $R_2O_3$, $TO_2$, QO, compressing the mixture obtained and subjecting it to an appropriate heat treatment.

However, a novel method of manufacturing the materials according to the invention, which is also that used in the examples given further on, consists in partially substituting the trivalent ions in the structure of the ferrite by bivalent ions, associated with quadrivalent ions.

It is in fact known that the substances $(TiO_2NiO)$, $(TiO_2MnO)$, and $(TiO_2Mgo)$, for example, have the corundum space group structure $D_{3d}^6$ and can perfectly well be substituted for iron oxide $Fe_2O_3$ in the spinel structure. Thus a starting mixture composed of a quantity of bivalent and trivalent metal oxides in suitable proportions to which is added, for example, the compound $(TiO_2NiO)$, after sintering at approximately 1000° C., also in air, for about an hour.

A homogeneous mixture of the oxides is then prepared by known methods in a steel ball mill. The powder obtained is then compressed into cores of the desired geometrical shape. The compression takes place without the addition of any binding agent at pressures of the order of several tons per cm.² and even reaching high pressures, for example, 7 to 8 tons per cm.². This makes it possible to avoid the long and diffiicult operations which would be necessary to eliminate the added products.

The cores obtained are subjected to a heat treatment in an oxygen atmosphere having a slow rise in temperature, preferably with a stage of several hours towards 800° C. This stage at 800° C., the temperature at which the ferrite is formed, is favorable for obtaining a good density. The second stage is from 4 to 5 hours, at 1200° C. approximately. The cooling, which likewise takes place in oxygen takes approximately 20 hours; this slow cooling is favorable to the formation of solid solutions.

The use of ferrites according to the invention in two devices will be described hereinafter; in accordance with these two applications, given as examples, certain characteristics will be defined and studied which will clearly show the properties of the ferrites at hyperfrequencies.

A sample of a ferrite in the form of a cylindrical rod is placed in the circular guide of a Faraday rotator, in such a way that the axes of the guide and the rod coincide. In practice, a plane polarized wave passing through a Faraday rotating cell undergoes three changes:

Its polarization plane rotates by an angle $\theta$.

A certain amount of energy is lost by absorption in the material; this represents the losses inherent in the sample; the logarithm of the ratio of the power obtained at the output of the cell without the ferrite to the power obtained on the output of the cell after the introduction of the ferrite is called attenuation $\alpha$. It is expressed in decibels.

On the output of the sample, the wave is no longer plane polarized but elliptically polarized; the ellipticity $e$ is defined as the logarithm of the ratio of the power of the polarized wave along the major axis to the power of the polarized wave along the minor axis of the ellipse and this is likewise expressed in decibels.

The quality factor is defined as the ratio $\theta/\alpha$ of the Faraday rotation to the attenuation.

Another example of the use of ferrites according to the invention is their use in a reciprocal phase shifter of the type known as Reggia-Spencer; this apparatus has been described in particular by F. Reggia and E. G. Spencer in an article published in the journal Proceedings of the I.R.E., November 1957, pages 1510 to 1517.

$\phi$ designates the increase in phase shift of the phase shifter containing a ferrite rod, produced by the magnetic field created by the winding of the phase shifter.

The tests described in the following were carried out with a continuous magnetic field.

The invention will be better understood with the aid of the non-limitative examples given hereinafter and the attached figures.

EXAMPLE 1

We start with pure oxides containing less than 0.05% by weight of impurities. These oxides are ground and thoroughly mixed in a steel ball mill for 24 hours. The molecular composition of the mixture before grinding is the following:

40 $Fe_2O_3$, 9 MnO, 46 MgO, 5 ($TiO_2NiO$)

in molecular percentages, the compounds ($TiO_2NiO$) having been sintered beforehand at 1000° C. in air for an hour. The molecular percentage of manganese oxide is conventionally referred to the number of manganese atoms, that is to say it is usually represented by MnO, although in practice different manganese oxides may be used, such as $MnO_2$, $Mn_3O_4$, etc.

The mixture is then compressed into the desired shape and subjected to a heat treatment at a temperature of 1200° C. for 4 hours in an oxygen atmosphere. The cooling takes 20 hours.

An example of the use of this material exploiting the Faraday effect is given hereinafter.

A sample of ferrite in cylindrical rod form 6.5 mm. in diameter and 84 mm. long, is placed in the circular wave guide (diameter 22.9 mm.) of a Faraday rotator, the axes of the guide and the ferrite coinciding. The measurements are carried out at a frequency of 9200 mc./s.

The results obtained for the attenuation α, the Faraday rotation θ, the ellipticity e and the merit factor θ/α, for different values of the continuous longitudinal field, at a temperature of +20° C., are given in Table 1.

TABLE I

| H Oersteds | α db | θ degrees | e db | α/θ |
|---|---|---|---|---|
| 0 | 0.61 | 0 | 40 | 0 |
| 3.7 | 0.61 | 35 | 40 | 57 |
| 7.4 | 0.61 | 98 | 40 | 161 |
| 11.1 | 0.61 | 164 | 40 | 269 |
| 14.8 | 0.61 | 242 | 40 | 400 |
| 18.5 | 0.61 | 294 | 40 | 483 |
| 37 | 0.57 | 421 | 40 | 740 |
| 74 | 0.51 | 494 | 40 | 900 |
| 148 | 0.51 | 525 | 40 | 1030 |

Figure 1:
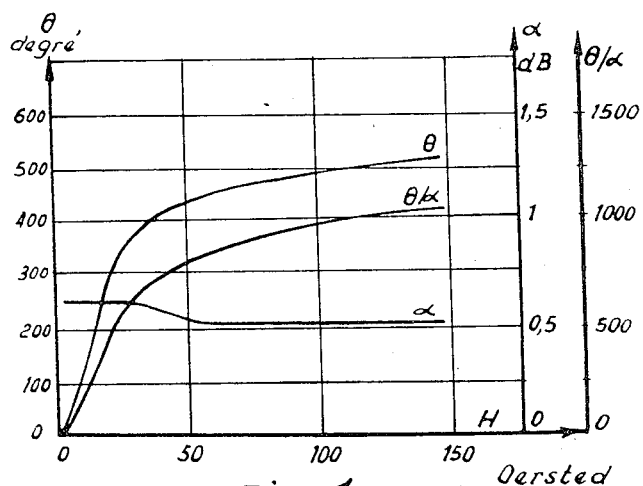
FIG. 1 shows the variations in the attenuation α, the Faraday rotation θ and the quality factor θ/α, obtained for a sample of ferrite according to Example 1 of the present description, as a function of the continuous field applied to the ferrite.

FIGURE 1 represents the variations in the characteristics α, θ and θ/α as a function of the continuous field applied.

Another example of the use of the ferrite under consideration is its use in a phase shifter of the Reggia-Spencer type. A rod of ferrite 6.5 mm. in diameter and 80 mm. long is placed in the rectangular wave guide of the phase shifter in such a manner that the axes of the ferrite and the guide coincide. The dimensions of the cross section of the guide are 22.86 mm. x 10.16 mm. The measurements of the phase shift are carried out at a frequency of 9400 mc./s.

Figure 2:
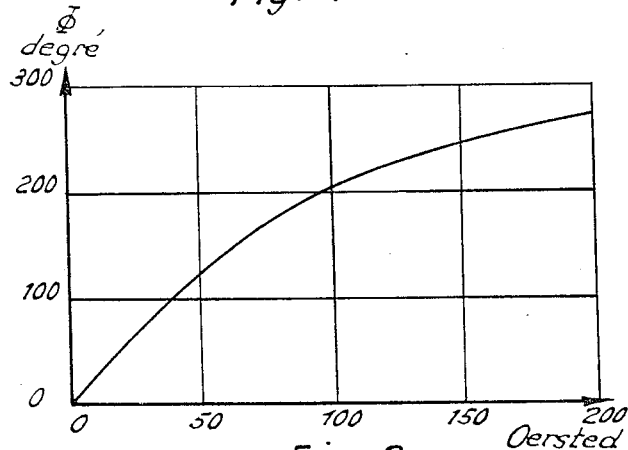
FIGURE 2 and 3 represent the variation in phase shift φ obtained for a ferrite according to Example 1, as a function of the continuous field applied and of the temperature respectively.
Figure 3:
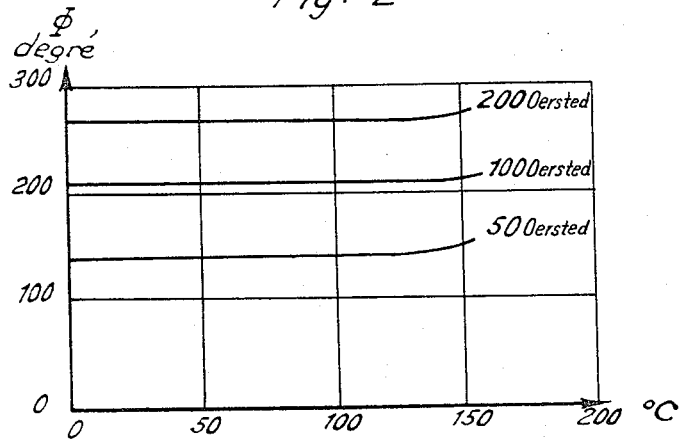

FIGURE 2 represents the variation in the phase shift φ as a function of the continuous field applied for the ferrite under consideration and FIGURE 3 the variation in phase shift φ as a function of the temperature for different values of the continuous field applied (50, 100 and 200 oersteds). It is found that the variation in phase shift is less than 4% for a temperature zone from 0 to 150° C.

EXAMPLE 2

The method of manufacture of the material is the same as for Example 1.

The molecular composition of the mixture, before grinding, is the following:

50 NiO, 25 $Fe_2O_3$, 25 ($TiO_2NiO$)

in molecular percentages.

Figure 4:
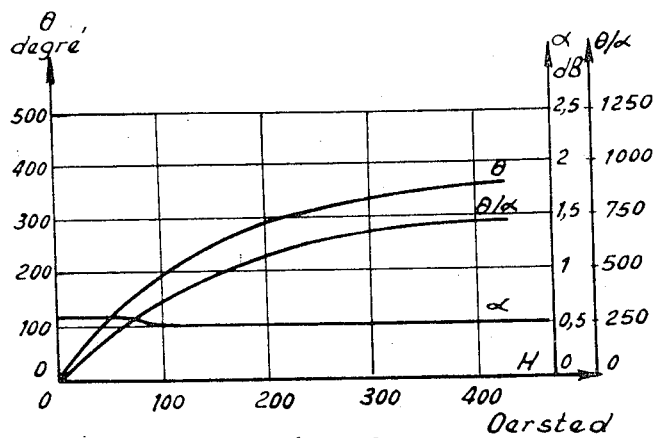
FIGURES 4, 5 and 6 represent the variation in the corresponding magnitudes for a ferrite according to Example 2.

A sample of the ferrite obtained is placed in a Faraday rotator under the same conditions as those described for the sample of Example 1. The results are given in Table II and shown in FIG. 4.

TABLE II

| H Oersteds | α db | θ degrees | e db | α/θ |
|---|---|---|---|---|
| 0 | 0.6 | 0 | 40 | 0 |
| 3.7 | 0.6 | 6 | 40 | 10 |
| 7.4 | 0.6 | 15 | 40 | 25 |
| 11.1 | 0.6 | 25 | 40 | 42 |
| 14.8 | 0.6 | 46 | 40 | 77 |
| 18.5 | 0.6 | 57.5 | 40 | 96 |
| 37 | 0.5 | 97 | 40 | 194 |
| 74 | 0.5 | 152 | 40 | 304 |
| 148 | 0.5 | 240 | 40 | 480 |
| 296 | 0.5 | 335 | 40 | 670 |
| 444 | 0.5 | 363 | 40 | 726 |

A sample of ferrite according to Example 2 is placed in a phase shifter of the Reggia-Spencer type under the same conditions as those described for the sample in Example 1.

Figure 5:
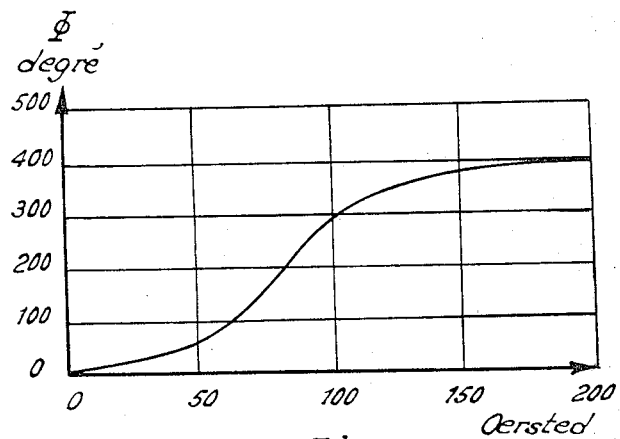
Figure 6:
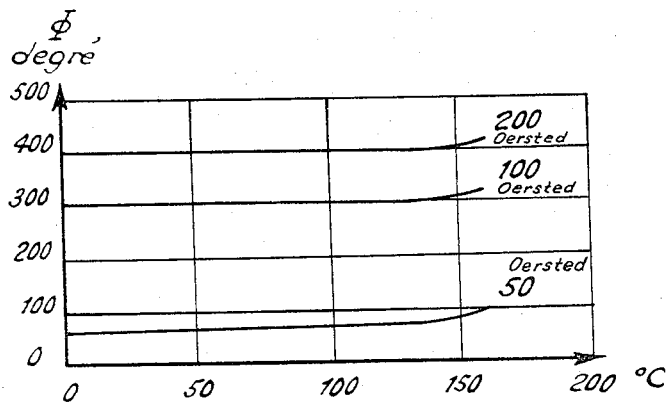

FIGURE 5 shows the variation in phase shift φ as a function of the continuous field applied for the ferrite under consideration. FIGURE 6 shows the variation in phase shift φ as a function of the temperature, for different values of the continuous field applied (50, 100 and 200 oersteds). It is found that the variation in phase shift is less than 4% for a temperature range from 0 to 150° C.

EXAMPLE 3

The method of manufacture of the material is the same as for Example 1. The molecular composition of the mixture, before grinding, is the following:

50 MgO, 5 MnO, 40 $Fe_2O_3$, 5 ($TiO_2MnO$)

in molecular percentages.

Figure 7:
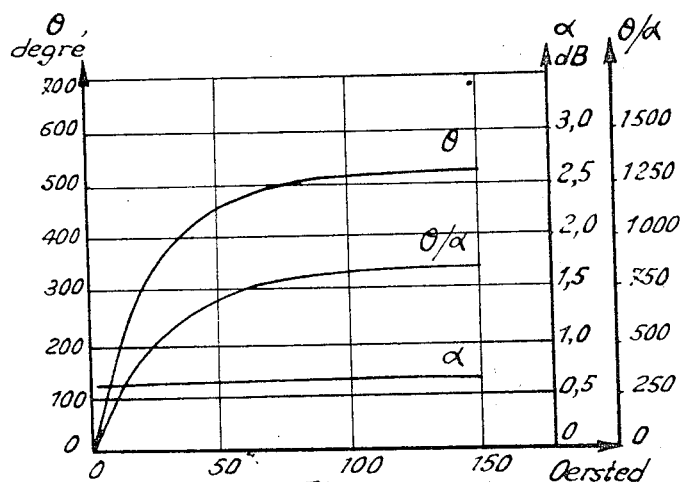
FIGURES 7, 8 and 9 represent the variation in the corresponding magnitudes for a ferrite according to Example 3.

A sample of the ferrite obtained is used in a Faraday rotator under the same conditions as those described for the sample of Example 1. The results are given in Table III and shown in FIG. 7.

TABLE III

| H Oersteds | α db | θ degrees | e db | θ/α |
|---|---|---|---|---|
| 0 | 0.62 | 0 | 40 | 0 |
| 3.7 | 0.62 | 32 | 40 | 52 |
| 7.4 | 0.62 | 95 | 40 | 153 |
| 11.1 | 0.62 | 160 | 40 | 258 |
| 14.8 | 0.62 | 239 | 40 | 385 |
| 18.5 | 0.63 | 290 | 40 | 460 |
| 37 | 0.63 | 418 | 40 | 663 |
| 74 | 0.64 | 494 | 40 | 772 |
| 148 | 0.64 | 520 | 40 | 812 |

A sample of ferrite according to Example 3 is used in a phase shifter of the Reggia-Spencer type under the same conditions as those described for the sample in Example 1.

Figure 8:
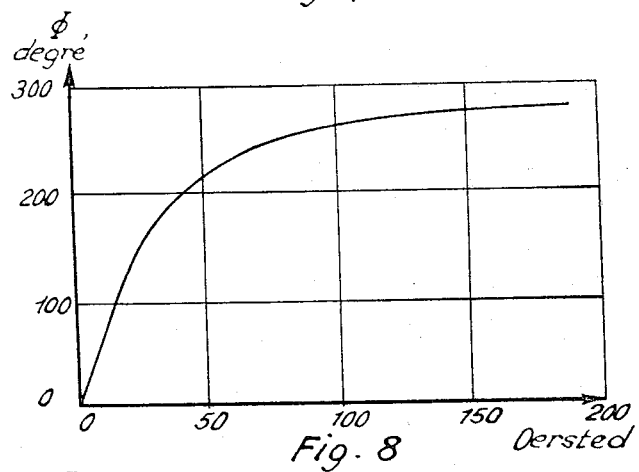
Figure 9:
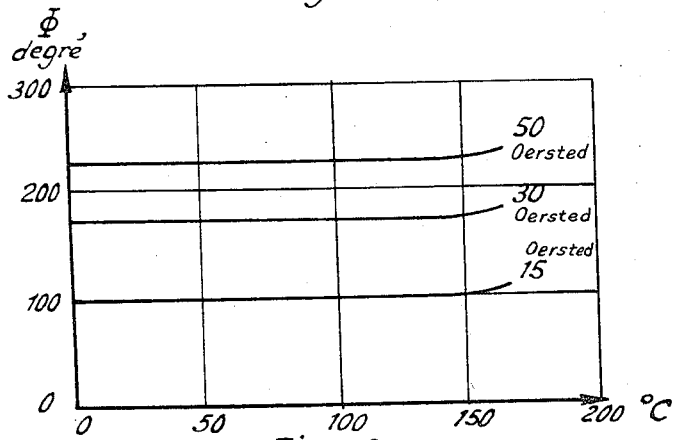

FIGURE 8 represents the variation in phase shift φ as a function of the continuous field applied for the ferrite under consideration; and FIG. 9 the variation of the phase shift $\phi$ as a function of the temperature, for different values of the continuous field applied (15, 30 and 50 oersteds). It is found that the variation in the phase shift is less than 4% for a temperature range from 0 to 150° C.

EXAMPLE 4

The method of manufacture of the material is the same as for Example 1.

The molecular composition of the mixture before grinding is as follows:
45 NiO, 5 MgO, 45 Fe$_2$O$_3$, 5 (TiO$_2$MgO)
in molecular percentages.

Figure 10:
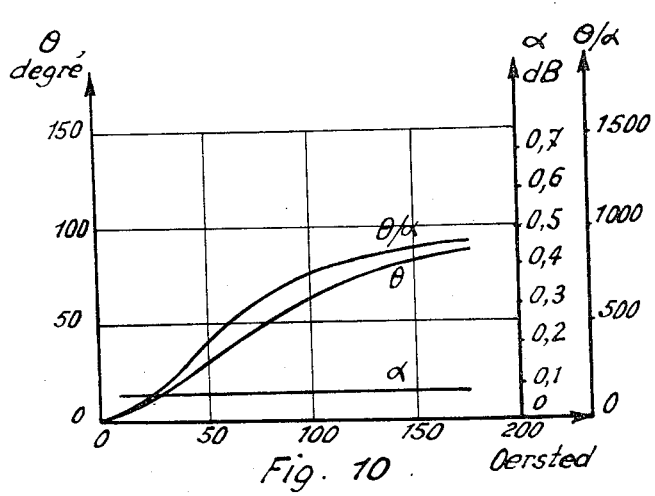
FIGURES 10, 11 and 12 represent the variation in the corresponding magnitudes for a ferrite according to Example 4.

A sample of the ferrite obtained is placed in a Faraday rotator under the same conditions as those described for the sample in Example 1. The results are given in Table IV and shown in FIG. 10.

TABLE IV

| H Oersteds | $\alpha$ db | $\theta$ degrees | $e$ db | $\theta/\alpha$ |
| --- | --- | --- | --- | --- |
| 20  | 0.08  | 5  | 40 | 62  |
| 30  | 0.08  | 10 | 40 | 125 |
| 35  | 0.08  | 19 | 40 | 237 |
| 40  | 0.08  | 24 | 40 | 300 |
| 45  | 0.08  | 28 | 40 | 350 |
| 50  | 0.082 | 35 | 40 | 426 |
| 55  | 0.082 | 39 | 40 | 475 |
| 60  | 0.083 | 45 | 40 | 542 |
| 80  | 0.084 | 58 | 40 | 690 |
| 90  | 0.084 | 62 | 40 | 738 |
| 100 | 0.089 | 66 | 40 | 740 |
| 110 | 0.093 | 69 | 40 | 741 |
| 170 | 0.094 | 77 | 40 | 817 |

A sample of ferrite according to Example 4 is placed in a phase shifter of the Reggia-Spencer type under the same conditions as those described for the sample in Example 1.

Figure 11:
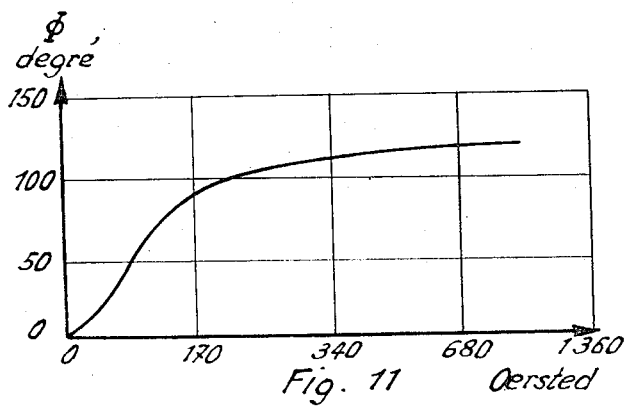
Figure 12:
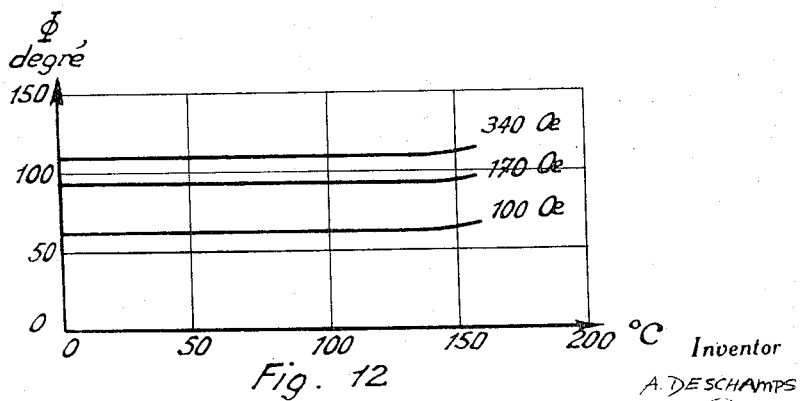

FIGURE 11 represents the variation in phase shift $\phi$, as a function of the continuous field applied, for the ferrite under consideration, and FIGURE 12 the variation in phase shift $\phi$ as a function of the temperature for different values of the continuous field applied (100, 170 and 340 oersteds). It is found that the variation in phase shift is less than 4% for a temperature range from 0 to 150° C.

EXAMPLE 5

As already stated, the products (TO$_2$QO) indicated have a corundum structure (space group $D/_{3d}{}^6$), which explains the possibility of substituting this group of ions for the oxide Fe$_2$O$_3$ in the spinel structure.

The other oxides of quadrivalent metals, associated with the oxides of bivalent metals, do not have this structure. However, it is possible to substitute a number of the ions Ti$^{++++}$ by ions Sn$^{++++}$, in a small proportion: for example (Ti$_{1-a}$Sn$_a$)O$_2$NiO, with $a$ less than 0.3.

The molecular composition of the mixture before grinding is the following:
40 Fe$_2$O$_3$, 9 MnO, 46 MgO, 5 [(Ti$_{0.8}$Sn$_{0.2}$)O$_2$NiO], in which the compound (Ti$_{0.8}$Sn$_{0.2}$)O$_2$NiO, before mixing, is presintered at 1000° C. in air. The whole mixture is then compressed into the desired shape and subjected to a heat treatment at a temperature of 1200° C., for 4 hours in an oxygen atmosphere. The cooling takes place over a period of 20 hours. The measurements are taken at 9200 mc./s. in a Faraday rotator. The ferrite sample is a cylinder/rod 6.5 mm. in diameter and 84 mm. long.

The results obtained for the attenuation $\alpha$, the Faraday rotation $\theta$ the ellipticity $e$ and the merit factor $\theta/\alpha$, for example for a continuous field of 80 oersteds, at a temperature of 20° C., are given in Table V.

TABLE V

| H Oersteds | $\alpha$ db | Degrees | $e$ db | $\theta/\alpha$ |
| --- | --- | --- | --- | --- |
| 80 | 0.5 | 450 | 40 | 900 |

This ferrite has the same qualities of phase shift stability as a function of the temperature as the ferrites in the preceding examples.

While I have described above the principles of my invention in connection with specific examples, it is to be clearly understood that this invention is made only by way of example and not as a limitation to the scope of my invention as set forth in the objects thereof and in the accompanying claims.

What I claim is:
1. In the method for making ferromagnetic materials of the ferrite type for use at hyper-frequencies and having a molecular composition, after annealing, of:

$$xLOyR_2O_3$$
$$z(TO_2QO)$$

with $$48 \leqslant x \leqslant 52$$
$$y+z=100-x$$

and $$0.5 \leqslant z \leqslant 45.0$$

where L and Q each represent a bivalent metal from the group consisting of:

Fe$^{++}$, Mn$^{++}$, Co$^{++}$, Ni$^{++}$, Mg$^{++}$, Zn$^{++}$

R represents at least one trivalent metal from the group consisting of:

Fe$^{+++}$, Cr$^{+++}$, Al$^{+++}$, Ga$^{+++}$, Mn$^{+++}$

T represents at least one quadrivalent metal from the group consisting of:

Ti$^{++++}$, Ti$^{+++++}$ containing up to 30% Sn$^{++++}$ and where Fe$^{+++}$ is always present as iron oxide Fe$_2$O$_3$, and consistutes at least three quarters of $yR_2O_3$, the steps which comprise:
(a) preparing a first compound (TO$_2$QO);
(b) forming a titanate having a corundum structure by sintering said first compound in air at about 1000° C. for about one hour;
(c) mixing a mixture of oxides corresponding to the compound (LOR$_2$O$_3$) with said sintered titanate the R$_2$O$_3$ portion of said second compound having the same crystalline structure as said titanate;
(d) grinding the combined mixture;
(e) forming the thus ground mixture into cores of desired shapes;
(f) slowly heating said cores in an oxygen atmosphere for several hours at a temperature of about 1200° C; and
(g) slowly cooling said cores for about 20 hours.

2. The method as set forth in claim 1 wherein the cores are first heated for several hours at a temperature of about 800° C. and thereafter heated for from four to five hours at a temperature of about 1200° C.

References Cited by the Examiner

UNITED STATES PATENTS

| | | | |
| --- | --- | --- | --- |
| 2,906,710 | 9/1959 | Kulcsar et al. | 252—62.9 |
| 2,982,732 | 5/1961 | Brownlow | 252—62.5 |
| 3,072,576 | 1/1963 | Greenhouse | 252—62.5 |

FOREIGN PATENTS 1,095,900  12/1960  Germany.

TOBIAS E. LEVOW, *Primary Examiner.*

M. A. BRINDISI, R. D. EDMONDS,
*Assistant Examiners.*